US008670787B1

(12) United States Patent
Todd

(10) Patent No.: US 8,670,787 B1
(45) Date of Patent: Mar. 11, 2014

(54) TRANSMISSION OF LOCATION AND DIRECTIONAL INFORMATION ASSOCIATED WITH MOBILE COMMUNICATION DEVICES

(75) Inventor: Steven Todd, Westfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2115 days.

(21) Appl. No.: 11/321,827

(22) Filed: Dec. 29, 2005

(51) Int. Cl.
*H04W 24/00* (2009.01)

(52) U.S. Cl.
USPC .................. 455/456.5; 455/456.1; 455/435.2; 455/445; 455/12.1; 455/414.1; 455/461; 455/432.3; 370/466; 370/328

(58) Field of Classification Search
USPC .................. 455/456.1, 435.2, 445, 12.1, 427; 455/414.1, 417, 461, 432.3, 406; 342/357.1; 370/466, 328; 705/1; 379/211.02, 211.01, 93.01, 88.18, 379/221.01
See application file for complete search history.

(56) References Cited

U.S. PATENT DOCUMENTS

| 6,799,052 | B2 | 9/2004 | Agness et al. |
|---|---|---|---|
| 6,937,868 | B2 | 8/2005 | Himmel et al. |
| 6,980,814 | B2 * | 12/2005 | Nohara et al. ............. 455/456.1 |
| 7,203,294 | B2 * | 4/2007 | Carnazza et al. ........ 379/142.07 |
| 7,212,614 | B1 * | 5/2007 | Burg et al ................. 379/88.18 |
| 7,742,757 | B2 | 6/2010 | Carlson |
| 2002/0149515 | A1 * | 10/2002 | Alanen et al. .............. 342/357.1 |
| 2002/0181694 | A1 * | 12/2002 | Mani ........................ 379/373.02 |
| 2002/0183069 | A1 * | 12/2002 | Myr ............................. 455/456 |
| 2003/0016804 | A1 * | 1/2003 | Sheha et al. ............. 379/201.06 |
| 2003/0125044 | A1 * | 7/2003 | Deloach et al. .............. 455/456 |
| 2004/0028208 | A1 * | 2/2004 | Carnazza et al. ........ 379/221.01 |
| 2004/0141602 | A1 * | 7/2004 | Gosselin .................... 379/142.1 |
| 2004/0170139 | A1 * | 9/2004 | Gosselin ....................... 370/328 |
| 2005/0032527 | A1 * | 2/2005 | Sheha et al. ............... 455/456.1 |
| 2005/0113096 | A1 * | 5/2005 | Gayde et al. ................. 455/445 |
| 2005/0122259 | A1 * | 6/2005 | Sairo et al. ................. 342/357.1 |
| 2005/0233742 | A1 * | 10/2005 | Karaoguz et al. .......... 455/432.3 |
| 2006/0251115 | A1 * | 11/2006 | Haque et al. .................. 370/466 |
| 2007/0015507 | A1 * | 1/2007 | Petronelli .................. 455/435.2 |
| 2007/0179792 | A1 * | 8/2007 | Kramer ............................. 705/1 |
| 2007/0189489 | A1 * | 8/2007 | Carnazza et al. ........ 379/211.02 |

* cited by examiner

*Primary Examiner* — Joseph Arevalo

(74) *Attorney, Agent, or Firm* — Hartman & Citrin LLP

(57) ABSTRACT

A method and arrangement for providing location information of a called mobile communication device to a calling party is implemented through a mobile device locator platform disposed in the communication network. A mobile device subscriber to the location service initiates a process where the location of his mobile device is updated on a regular basis and the location information stored in a database on the platform. When a call is placed to his subscribed device, the location information is transmitted to the calling party prior to setting up the call to the called device, allowing the calling party to determine whether or not to proceed with the call, as well as eliminating the need to ask the common question "where are you?" when placing a call to a mobile device.

11 Claims, 3 Drawing Sheets

TRANSMISSION OF LOCATION AND DIRECTIONAL INFORMATION ASSOCIATED WITH MOBILE COMMUNICATION DEVICES

TECHNICAL FIELD

The present invention relates to improved usage of mobile communication devices and, more particularly, to the ability to provide location and directional information of a called mobile communication device to the calling party.

BACKGROUND OF THE INVENTION

With the ever-increasing proliferation of mobile communication devices, there are opportunities daily for one to place a call to a cell phone number of a friend, family member or co-worker. Invariably, the conversation begins with the greeting "Hi, where are you?". In days past, when the telecommunications network was only a wireline network, such a greeting would be considered comical—the called party was at the residence/office associated with his telephone. However, it is now often useful, if not vital information, for the calling party to know the location of a called party using a mobile communication device.

There exists various systems for determining, with extreme precision, the location of each mobile communication device. Geocoding—a triangulation method involving the use of at least a pair of mobile base stations—is a well-understood technique for ascertaining the location of a mobile telephone. Global positioning systems (GPS) have become popular in recent years and are also capable of ascertaining the location of a mobile communication device including the appropriate type of transponder.

In the past, the location information of a mobile device has been used for a variety of applications, such as determining if the device is in a location (such as a hospital) where usage of such a device is prohibited. In this scenario, incoming calls will be immediately sent to the device's voice mail system (or to another "reach" telephone number). The location information of a mobile device may also be used to inhibit the device from initiating outbound calls to "forbidden" geographic areas (i.e., the mobile device may be restricted from placing any long distance and/or international calls).

To date, however, there has not been any development or methodology for providing this location information to a calling party, who may then determine whether or not to complete the call as a function of such location information.

SUMMARY OF THE INVENTION

The need remaining in the prior art is addressed by the present invention, which relates to improved usage of mobile communication devices and, more particularly, to the transmission of the mobile device's current location to someone placing a call (wireline or wireless) to the mobile device user.

In accordance with the present invention, a mobile device user subscribes to a "location" service, such that when others initiate calls to the subscriber's mobile device, his current location information is transmitted during call set-up to the calling party. Since the information is transmitted prior to completing call set up, the calling party may decide to terminate the call without incurring any expenses for either party.

In an advanced embodiment of the present invention, the location information may be enhanced to further include the "direction" and "speed" information associated with the mobile device (if the device is not stationary).

The dissemination of location information is controlled by the subscriber and, as such, the subscriber may determine the population of calling parties that may receive this information. For example, the subscriber may have a "buddy list" of calling party numbers associated with his subscriber record, where only calling parties on this buddy list may receive his location information. Alternatively, the subscriber may allow only incoming calls whose source can be identified (e.g., with CallerID capability) to read his location information (preventing unwanted incoming callers without full identification—"anonymous" or "unknown") from obtaining this information. In its most general form, however, the dissemination of this information does not have to be restricted at all by the subscriber.

In one embodiment of the present invention, the subscriber's location information may be provided as an "audio" message to the calling party. Alternatively, a text message or video message (map) may be transmitted to calling devices with screen capabilities.

Other and further advantages and features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
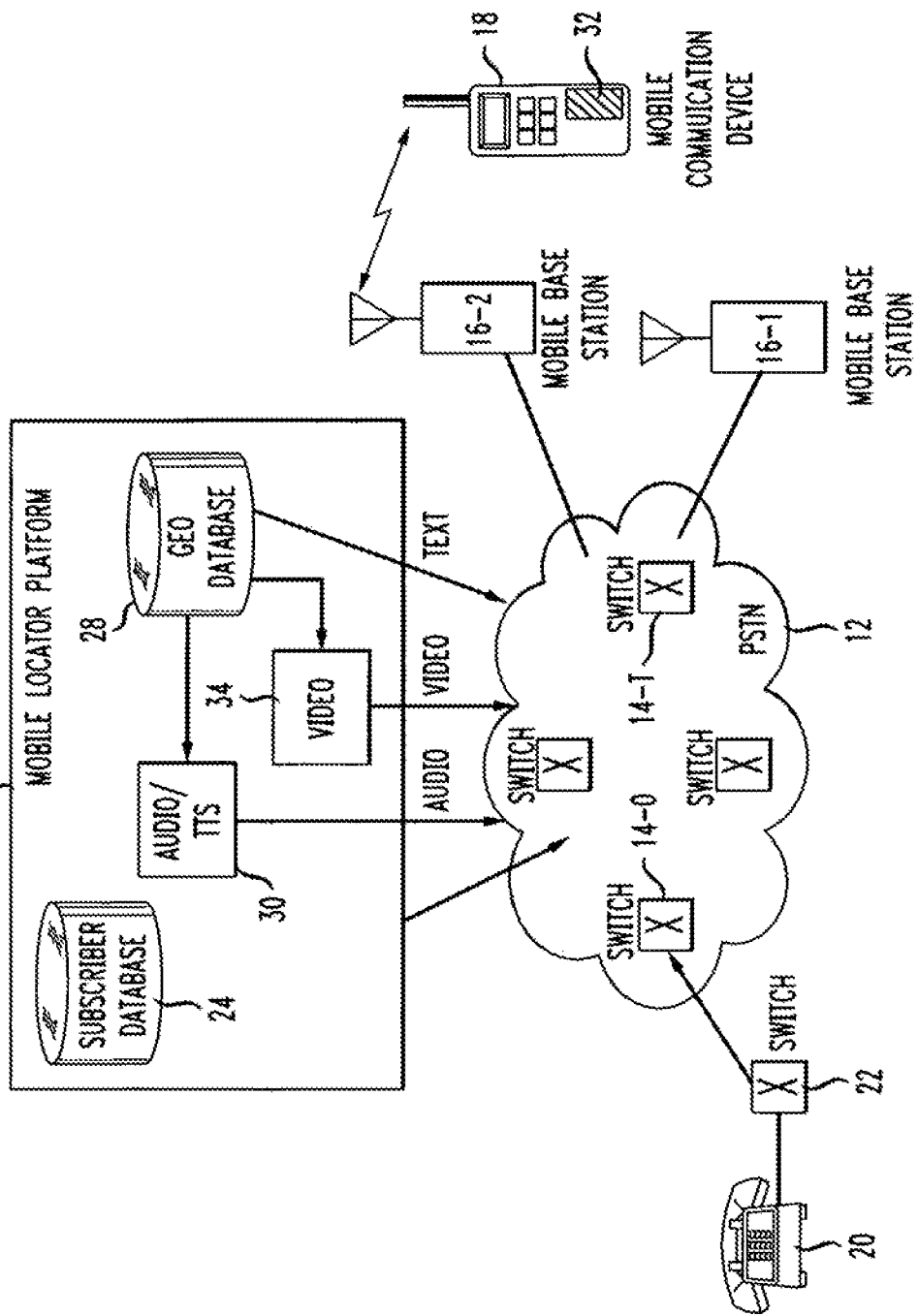
FIG. 1 illustrates an exemplary mobile communication network suitable for implementing the location service of the present invention.

FIG. 1 illustrates, in a simplified diagram, a network architecture 10 for providing mobile communication device location information to a calling party. As shown, architecture 10 includes a conventional telecommunications network 12, such as the Public-Switched Telephone Network (PSTN), including a plurality of switches 14 for routing voice traffic between calling and called parties. Also illustrated in FIG. 1 is a pair of mobile base stations 16-1 and 16-2, where these base stations are in communication with PSTN 12 and used as a "link" in communications between "wired" telephones communicating via the PSTN and "wireless" devices, such as a mobile communication device 18.

In placing a call to mobile device 18, a calling party at a "wired" (i.e., conventional) telephone 20 will go off-hook, receive a dialtone from a local telecommunications switch 22, and enter the digits associated with the cell phone number of mobile device 18 (in most cases, in the NPA-NXX-XXXX format). These digits are collected by switch 22 and forwarded to PSTN 12, in particular to an originating switch 14-O associated with local switch 22. Originating switch 14-O determines the necessary routing through PSTN 12 required to set up a communication path between the calling party at telephone 20 and the called party at mobile device 18, and forwards the call to a terminating switch 14-T within PSTN 12.

Up to this point in the call set-up process, there is no difference between the present invention and the prior art. However, in accordance with the present invention, the number associated with the called party (the "dialed number") is checked against a subscriber database 24 located within a mobile locator platform 26 formed in accordance with the present invention to determine if the called party has subscribed to the "location information" service of the present invention. If the dialed number is not found, the call progresses in conventional fashion, outward from PSTN 12 to the appropriate mobile base station for communication to mobile device 18.

If the called party/mobile device user is determined to have subscribed to the inventive "location information" service, the method of the present invention proceeds to first determine if there are any restrictions on the distribution of this information to calling parties. This restriction will be discussed below in association with the description of the database record in FIG. 2. Presuming that restrictions are not placed on the distribution of this information, the next step in the inventive method is to ascertain the current location of mobile device 18. In one implementation of the present invention, a geographic locator database 28 within mobile locator platform 26 is queried to determine the current location of the called party's mobile device 18. Geographic locator database 28 is maintained, for example, through regular updates (at five minute intervals, for example), through mobile base stations 16 that are also in communication with mobile locator platform 26. Alternatively, a real-time locating method (such as geo-coding triangulation) may be used to determine the location of mobile device 18.

Once the location information has been collected, this information is transmitted on the return call set-up path to the calling party's telephone 20, enabling the calling party to learn the geographic location of the called party without having to ask the called party "where are you?" once their conversation has begun. In one embodiment, the geographic location information may be converted to audio information within a translation unit 30 at locator platform 26 and transmitted as a return voice message to the calling party. For example, the message may be "you are now being connected to John Doe in Smithtown N.Y.". The message may also include "branding" information identifying the particular wireless service provider that is placing the call (i.e., "AT&T Wireless Services is now connecting you to John Doe in Smithtown, N.Y.").

It is known that the use of various "locator" methods may also obtain information regarding the current movement of a mobile device. For example, if mobile device 18 includes a location transponder 32, the real-time movement of mobile device 18 may be tracked and recorded. This speed and direction information may thus also be collected at mobile locator platform 26 and provided with the basic "location" information to the calling party. For example, the message to the calling party may be, "you are now being connected to John Doe, in Smithtown, N.Y., traveling south at 30 miles per hour". Therefore, with this additional information the calling party may decide to terminate the call, on the presumption that the called party is driving and should not be bothered. Many times, a calling party may only be interested in knowing the location of the called party (for example, a parent calling a teenaged child) and once this information is obtained, the call may be terminated (that is, prior to completing call set-up and initiating conversation and incurring expense).

In an alternative embodiment, if it is known that the called party's device includes a video display (such as, for example, on another cell phone or computer-based calling device), the location information may be converted into a video file within a video conversion unit 34 at platform 26 and then transmitted as a video file (either still-frame or moving frame), indicating the current location of the called party. Obviously, both the audio and video information may be transmitted, if desired, to the calling party. The location information, alternatively, may be directly transmitted as a text message from database 28 to calling party 20.

Once the location message has been delivered to calling party 20, the call set-up process will suspend action for a brief period of time (no more than a few seconds) so as to allow for the calling party to terminate the call without incurring any charges. That is, if the calling party determines, based on the received location information, that it would not be appropriate (or necessary) to try to contact the called party at that time, the calling party can merely hang up without incurring any charges. Otherwise, call set-up proceeds in conventional fashion and a voice call between the two parties can be initiated.

Figure 2:
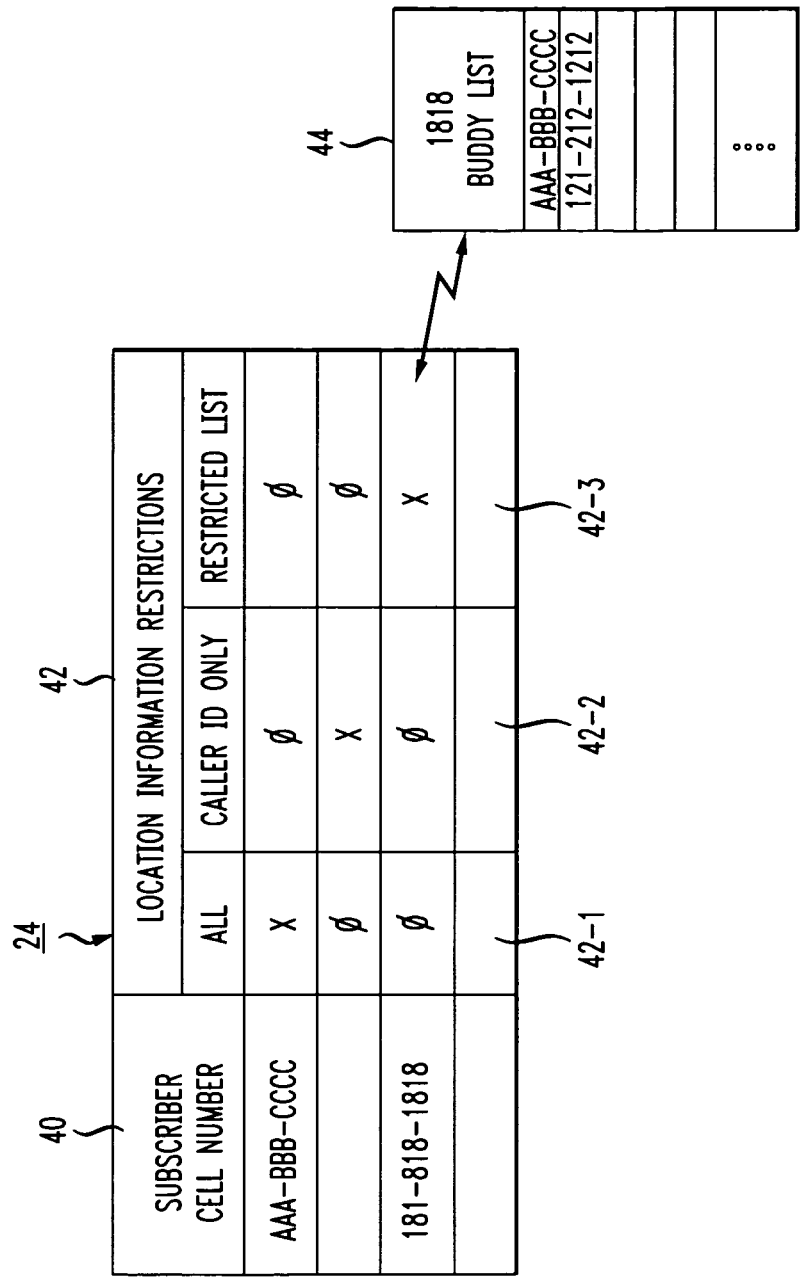
FIG. 2 illustrates an exemplary subscriber record.

FIG. 2 illustrates one exemplary configuration for subscriber database 24 as may be employed within mobile locator platform 26. As shown, this particular embodiment of database 24 includes a first field 40 listing the mobile device numbers (e.g., "cell phone" numbers) for the various subscribers to the inventive location identification service. A second field 42, defined as "location information restrictions", is used to determine to whom the subscriber's location information may be given. In this particular embodiments, restriction field 42 is broken down into three sub-fields, defined as "all" (sub-field 42-1), "identified callers only" (sub-field 42-2), and "restricted list" (sub-field 42-3). Of course, various other configurations and definitions of restrictions may be implemented in accordance with the present invention. For each subscribed mobile device telephone number, only one sub-field may be flagged as the defined restrictions. As shown, for cell phone number AAA-BBB-CCCC, sub-field 42-1 is flagged. In this case, therefore, the location information associated with mobile device AAA-BBB-CCCC may be given to every calling party. For mobile device 18 as discussed above in association with FIG. 1, restricted or "buddy list" sub-field 42-3 is flagged. In this particular arrangement, this flag is linked to a particular "buddy list" 44 provided by the subscriber, where his location information will be given only to the small set of calling numbers included on the buddy list. At any given time, a subscriber may turn "off" the location service by disabling one or more of the sub-fields. For example, over the weekend the called party's location information may not be germane to co-workers. The subscriber is permitted to gain access to database 28 and thus modify the activation of the various fields, as need be.

In a preferred embodiment of the present invention, the subscriber is permitted access to his specific record within database 24 and can, accordingly, modify the entries in his buddy list, or change the "restriction" sub-field flag in general. Moreover, it is presumed that a subscriber will have access to information at platform 26 in terms of generating a "report" identifying the frequency of callers, identity of callers, who (if any) terminated calls prior to set-up, etc.

Figure 3:
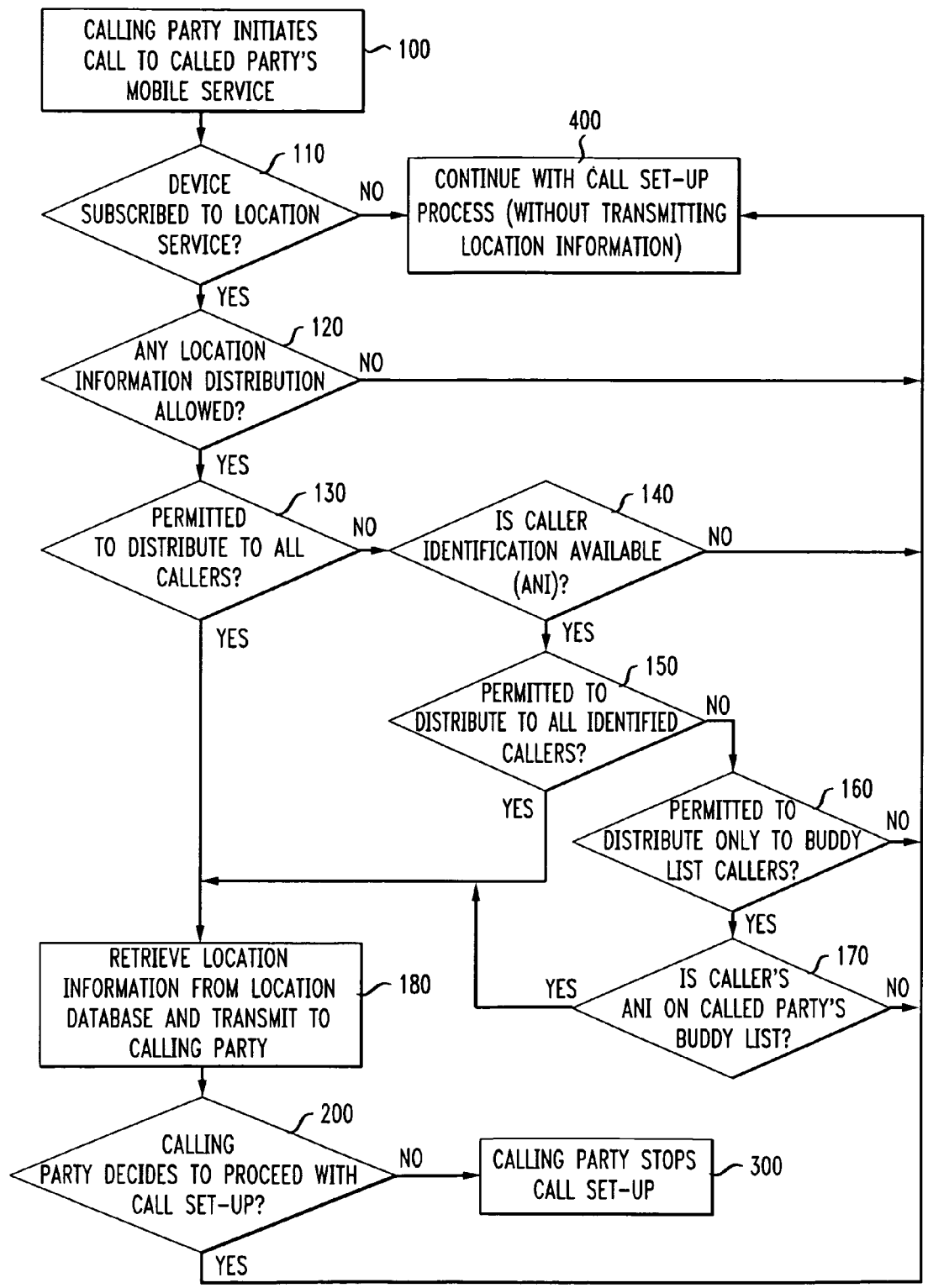
FIG. 3 is a flowchart of an exemplary process of using the location service of the present invention.

FIG. 3 contains a flowchart of an exemplary process of providing mobile device location information in accordance with the present invention. As shown, the process begins at step 100 with an individual placing a call to a mobile device number. When the call is initiated, a query is made to subscriber database 24 (step 110) to determine if the called number is subscribed to the location service. If not, the call set-up will continue in conventional fashion—that is, without transmitting any location information (step 400). If the called party is a subscriber, the next step (step 120) is to check for permission to distribute location information to the calling party (since the invention includes the ability for the subscriber to turn the permissions "on" and "off", as desired). If the permission is indeed turned "off", no location information may be transmitted and the process moves to step 400 for conventional call set-up.

Presuming that distribution of location information is permitted, the next step in the process (step 130) is to determine if the location information may be distributed to all calling parties (i.e., no restrictions). If the response to this query is in the negative, the next step (step 140) begins the process of determining what "class" of calling parties may receive the location information by determining if calling number identification information (such as ANI) is present. If no such information exists (thus indicating that the incoming call is a "nuisance" call), then the process again proceeds to step 400 for conventional call set-up. Otherwise, if caller identification information is present, a query is performed (step 150) to determine if the subscriber has given permission to distribute the location information to all identified callers. If the response to this query is in the negative, the next step in the process (step 160) is used to determine if the subscriber has supplied a "buddy list" of identified calling parties to which the location information may be distributed. If no buddy list is found, then conventional call set-up process is performed (step 400). If a buddy list for the subscriber is found, step 170 then determines if there is a match between the calling party's identification information (e.g., ANI) and an entry in the subscriber's buddy list. If there is no match, the process returns to conventional call set-up at step 400.

If there is a match between the calling party's identification information and a buddy list entry, the process continues to step 180 to retrieve the location information from geographic database 28 and transmit the location information to the identified calling party. Referring to the flowchart of FIG. 3, it is shown that a positive result to the queries of steps 130 and 150 ("all callers", and "all identified callers") also results in the process progressing to step 180 to retrieve the location information from database 28 and transmit to the calling party.

Once the calling party has received this information, the process "waits" for a response from the calling party (step 200) to see if the calling party wishes to continue with the call set-up process. If the response is negative, call set-up ceases and no charges are incurred by either party. Otherwise, the process then moves forward to step 400 to complete the call set-up.

The description of the present invention has been presented for purposes of illustration and description, and is not intended to be exhaustive or limited to the invention in only the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular contemplated use.

What is claimed is:

1. A method of providing mobile device location information of a called party to a calling party during a call set-up, the method comprising:
  creating a database of mobile communication device subscribers to a location service;
  maintaining a location database of current geographic location information for a mobile communication device associated with each of the mobile communication device subscribers to the location service;
  upon receiving an incoming call from the calling party to a mobile communication device of the called party, verifying, using the database of mobile communication device subscribers, if the mobile communication device of the called party is subscribed to the location service;
  if the mobile communication device of the called party is subscribed to the location service, ascertaining a current location of the mobile communication device of the called party from the location database;
  transmitting the current location of the mobile communication device of the called party to the calling party during the call set-up; and
  transmitting speed and direction information of the mobile communication device of the called party to the calling party.

2. The method of claim 1, further comprising:
  checking for restrictions on dissemination of the current location of the mobile communication device of the called party; and
  transmitting the current location to the calling party only if permitted.

3. The method of claim 2, wherein the database of mobile communication device subscribers to the location service includes a listing of permitted calling numbers for receiving the current location and wherein checking for the restrictions on the dissemination of the current location of the mobile communication device of the called party comprises determining if a calling number associated with the calling party is on the listing.

4. The method of claim 2, wherein checking for the restrictions on the dissemination of the current location of the mobile communication device of the called party comprises determining if a calling number associated with the calling party is identified.

5. A system comprising:
  a subscriber database comprising identified subscribers to a location service, the subscriber database comprising a mobile device number associated with a mobile communication device of a called party;
  a locator database comprising mobile device location information associated with the mobile communication device of the called party, the locator database for receiving the mobile device location information associated with the mobile communication device of the called party from a base station in communication with the mobile communication device of the called party;
  a switch for
    verifying, upon receiving an incoming call from a calling party to the mobile communication device of the called party, if the mobile communication device of the called party is subscribed to the location service, and
    if the mobile communication device of the called party is subscribed to the location service, ascertaining the mobile device location information associated with the mobile communication device of the called party from the locator database; and
  a transmission module for
    retrieving the mobile device location information associated with the mobile communication device of the called party from the locator database,
    transmitting the mobile device location information associated with the mobile communication device of the called party to the calling party during a call set-up between the calling party and the called party, and
    transmitting speed and direction information associated with the mobile communication device of the called party to the calling party during the call set-up.

6. The system of claim 5, wherein the locator database further comprises the speed and direction information associated with the mobile communication device of the called party.

7. The system of claim 5, wherein the subscriber database further comprises a restriction table identifying calling parties permitted to receive the mobile location information associated with the mobile communication device of the called party.

8. The system of claim 7, wherein the restriction table comprises a listing of permitted calling party numbers for the calling parties permitted to receive the mobile location information associated with the mobile communication device of the called party.

9. The system of claim 7, wherein the restriction table comprises an indication that unidentified calling party numbers are not permitted to receive the mobile location information associated with the mobile communication device of the called party.

10. The system of claim 5, further comprising a text-to-speech module for translating the mobile location information associated with the mobile communication device of the called party into an audio message to be transmitted to the calling party during the call set-up.

11. The system of claim 5, further comprising a text-to-video module for translating the mobile location information associated with the mobile communication device of the called party into a video map to be transmitted to the calling party during the call set-up.

* * * * *